(12) United States Patent
Ramsauer

(10) Patent No.: US 8,517,653 B2
(45) Date of Patent: Aug. 27, 2013

(54) SNAP FASTENER

(76) Inventor: Dieter Ramsauer, Schwelm (DE)

( * ) Notice: Subject to any disclaimer, the term of this patent is extended or adjusted under 35 U.S.C. 154(b) by 86 days.

(21) Appl. No.: 13/260,924

(22) PCT Filed: Jul. 17, 2009

(86) PCT No.: PCT/EP2009/005207
§ 371 (c)(1), (2), (4) Date: Feb. 2, 2012

(87) PCT Pub. No.: WO2010/112052
PCT Pub. Date: Oct. 7, 2010

(65) Prior Publication Data
US 2012/0117768 A1 May 17, 2012

(30) Foreign Application Priority Data
Apr. 1, 2009 (DE) .................. 20 2009 004 280 U

(51) Int. Cl.
*F16B 21/00* (2006.01)
(52) U.S. Cl.
USPC ......................................... 411/347; 411/356
(58) Field of Classification Search
USPC .................. 411/347, 356, 357, 358, 522, 552, 411/553; 24/606
See application file for complete search history.

(56) References Cited

U.S. PATENT DOCUMENTS

| 3,079,829 | A | * | 3/1963 | Chester .......................... 411/347 |
| 3,145,441 | A | * | 8/1964 | Strandrud ....................... 411/347 |
| 5,435,159 | A | | 7/1995 | Ramsauer |
| 7,198,306 | B2 | * | 4/2007 | Ambs ........................... 292/175 |
| 7,690,083 | B2 | * | 4/2010 | Ramsauer ........................ 16/382 |
| 7,731,465 | B2 | * | 6/2010 | Stapulionis et al. ........... 411/348 |
| 8,001,656 | B2 | * | 8/2011 | Ramsauer ........................ 16/416 |
| 8,162,581 | B2 | * | 4/2012 | Soltis et al. .................... 411/348 |
| 2005/0158147 | A1 | * | 7/2005 | Baus et al. ..................... 411/347 |
| 2007/0243042 | A1 | * | 10/2007 | Baus ............................. 411/347 |
| 2008/0003077 | A1 | * | 1/2008 | Anderson ...................... 411/347 |
| 2011/0014005 | A1 | * | 1/2011 | Shinozaki ...................... 411/347 |

FOREIGN PATENT DOCUMENTS

| DE | 20 2004 016 009 | 2/2006 |
| WO | WO 2008/128560 | 10/2008 |

OTHER PUBLICATIONS

International Search Report for Application No. PCT/EP2009/005207 mailed Dec. 1, 2009.

* cited by examiner

*Primary Examiner* — Roberta Delisle
(74) *Attorney, Agent, or Firm* — Frommer Lawrence & Haug LLP

(57) ABSTRACT

A snap fastener, for fastening a first thin wall to a second wall, has a base part and a head part extending away from this base part The head part presents a guide/channel for one or more push/holding elements. The ends of the push/holding elements project out of the guide/channel. The head part is provided as a housing with fastening projections. The housing can be snapped into through-openings in the first and second walls such that it grips only one wall. Unlocking devices are provided in the housing, which can pull the push elements back into the housing from the front, and which can disengage the housing from the other thin wall. According to the invention, a compression spring extending between the support plane of the base part and the associated edge plane of the thin wall (front panel) is arranged on the support plane of the base part.

11 Claims, 10 Drawing Sheets

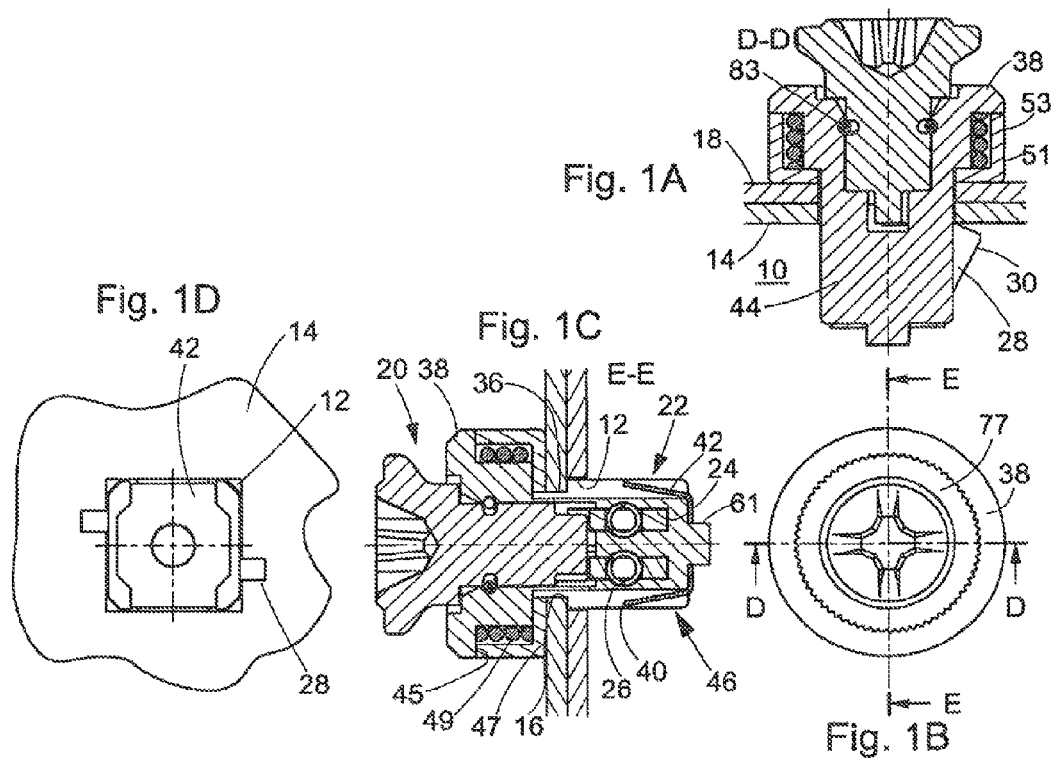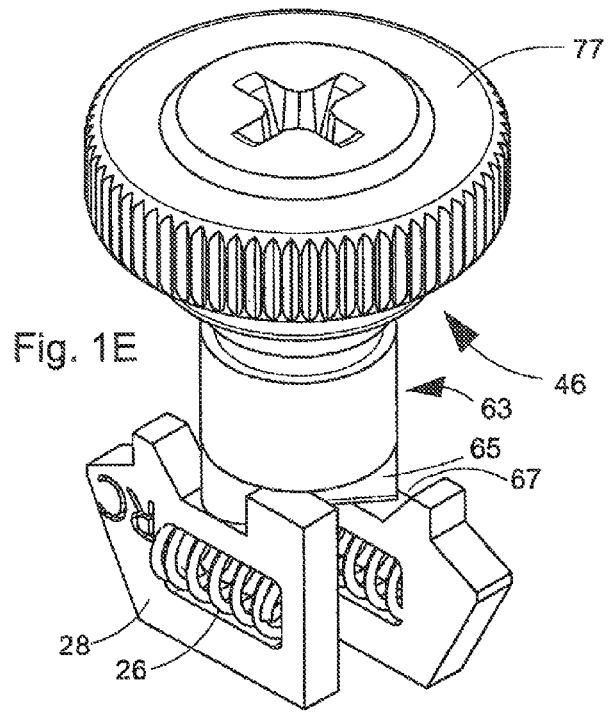

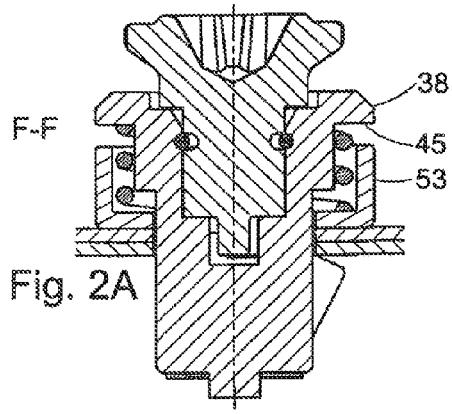
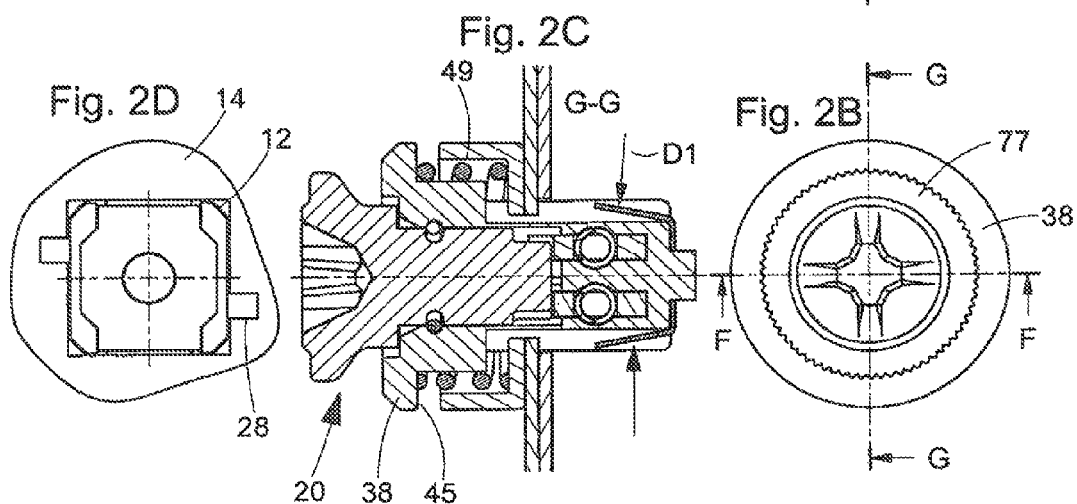
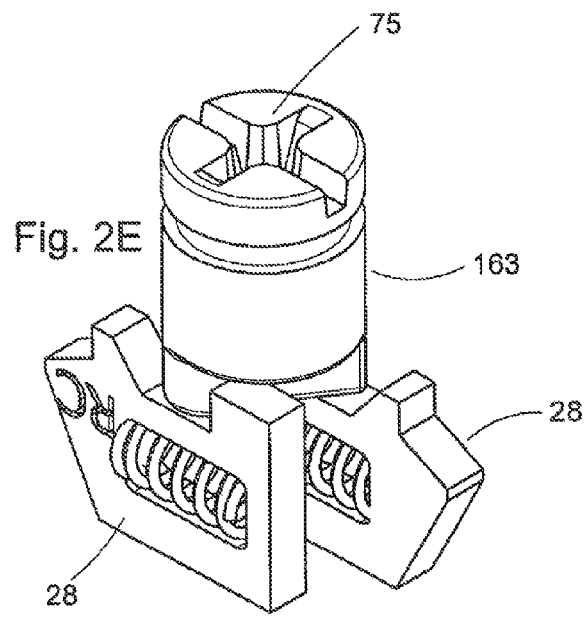

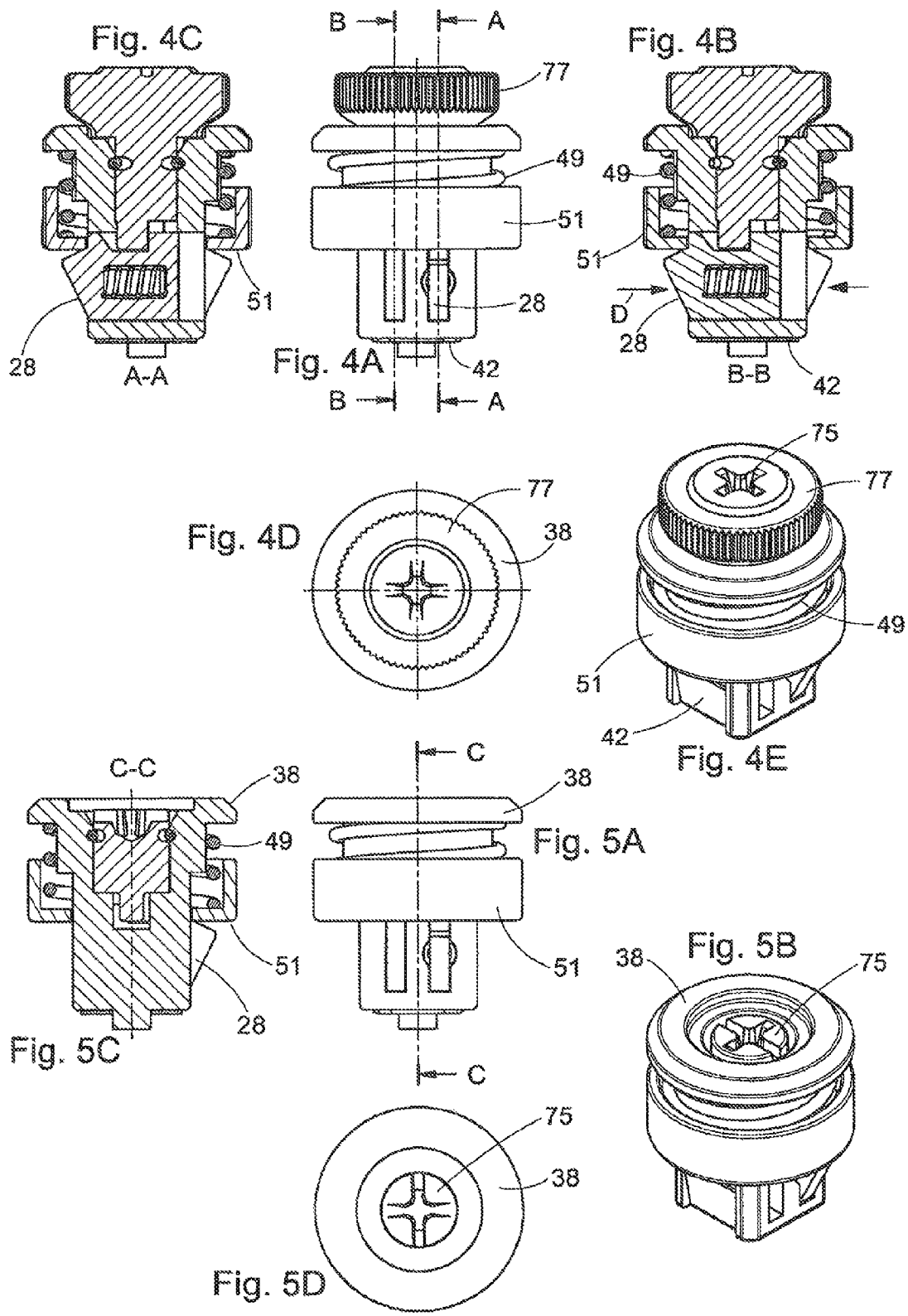

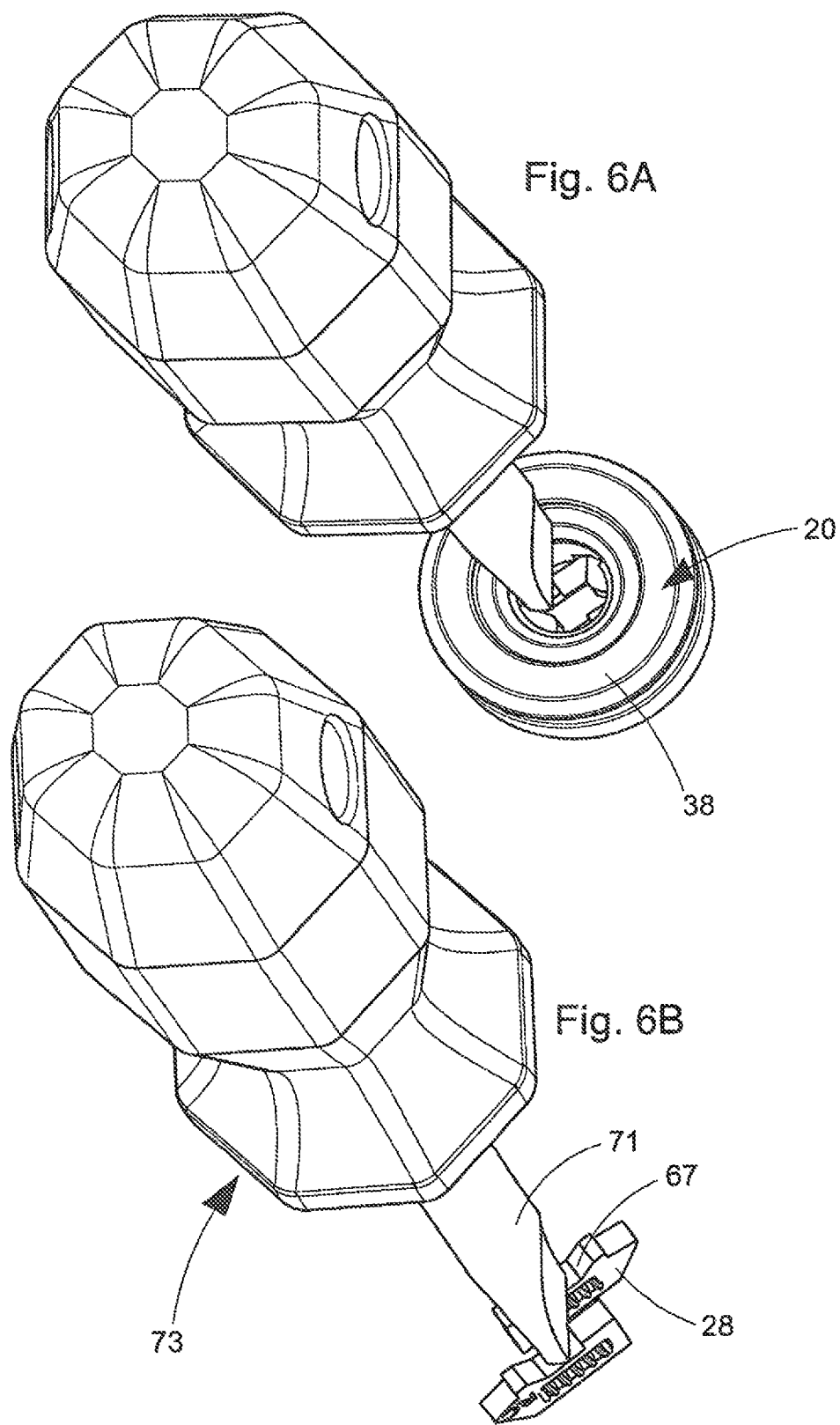

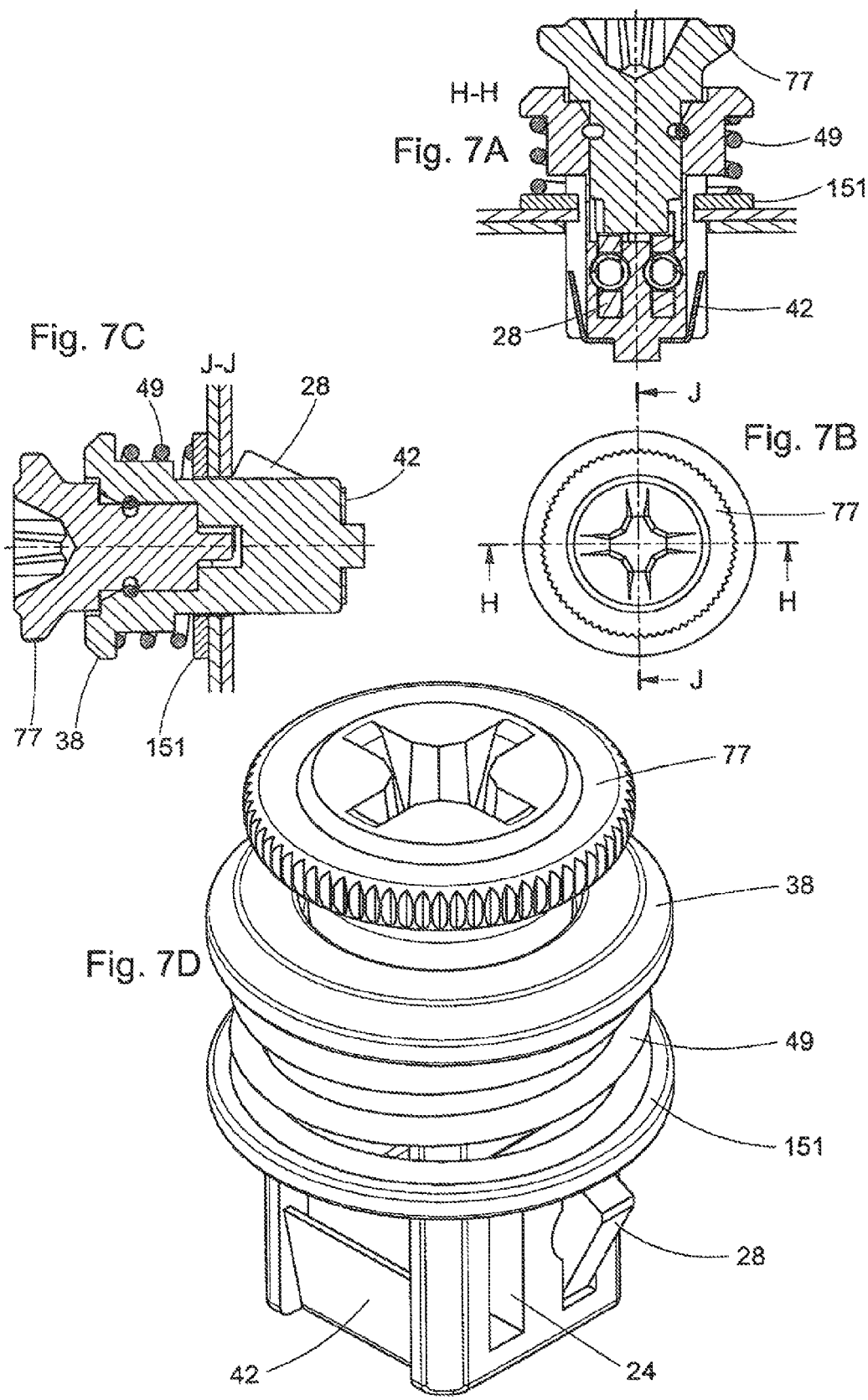

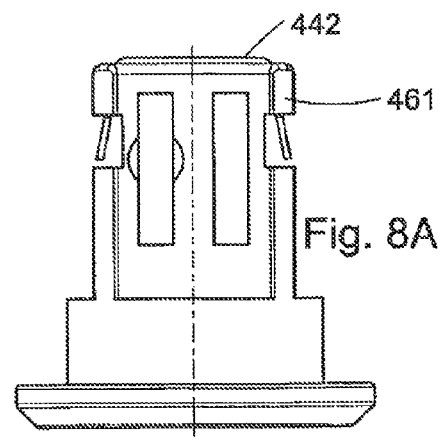
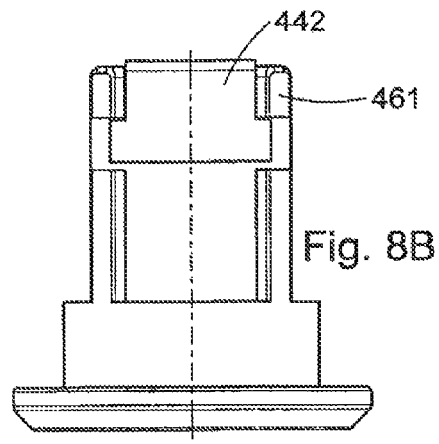
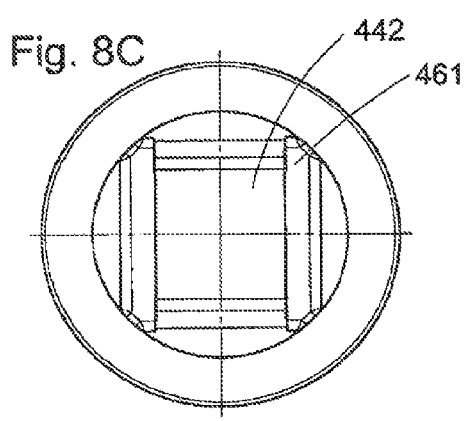
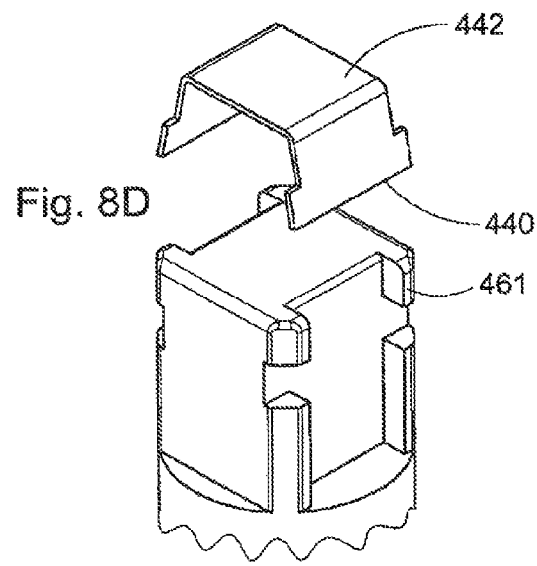
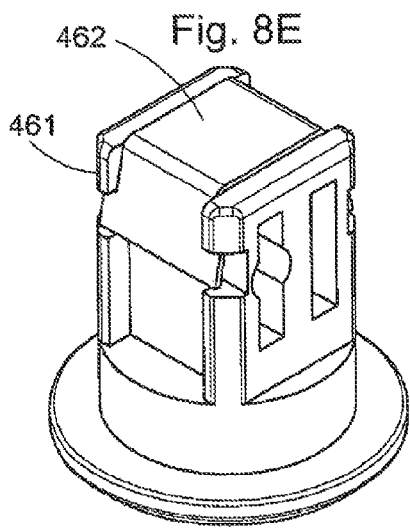
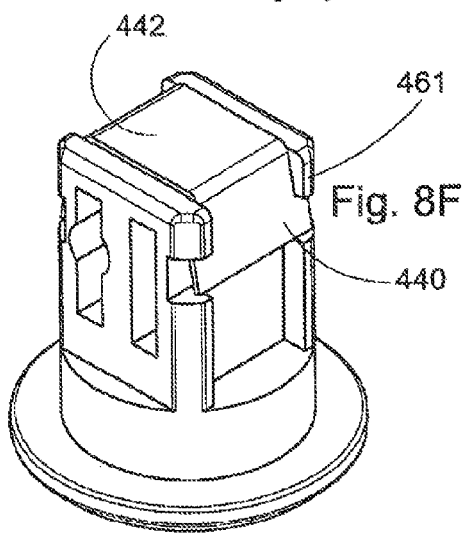

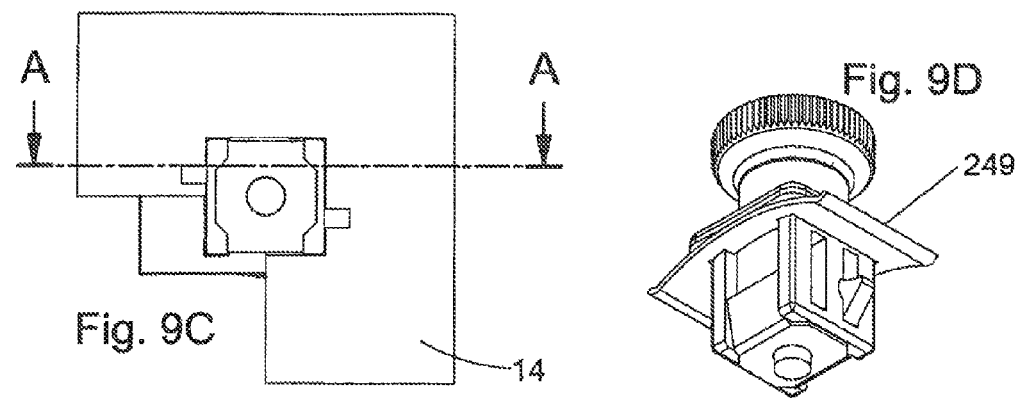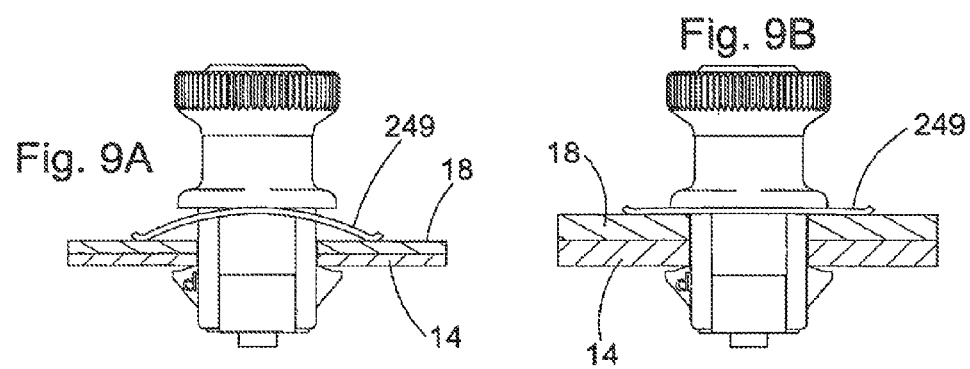

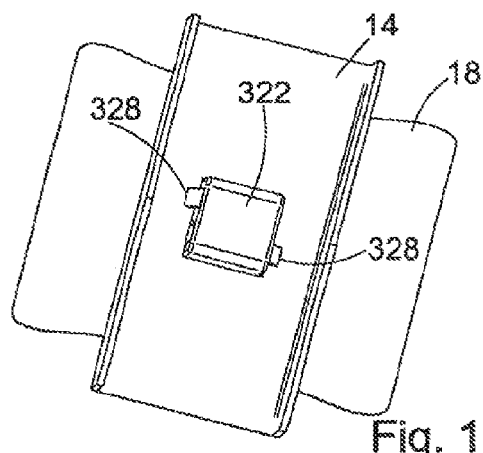
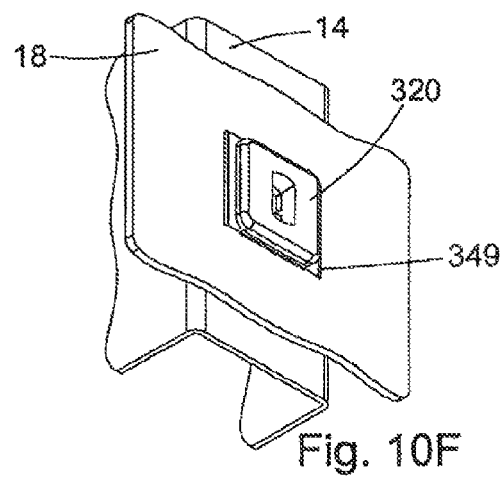
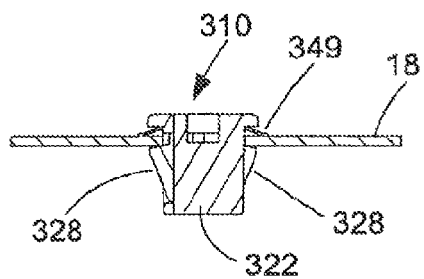
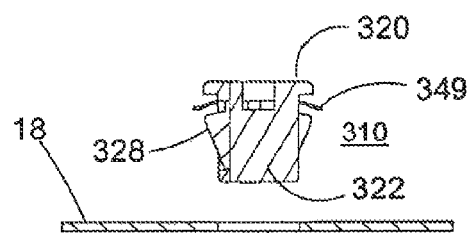
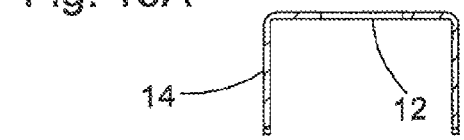
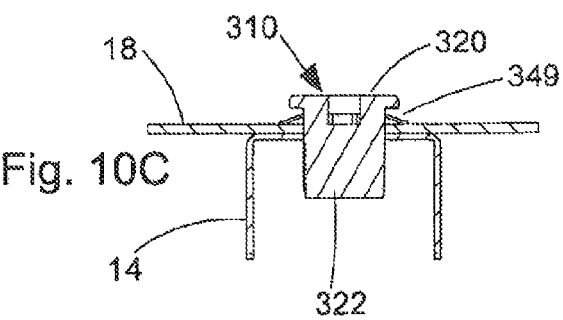

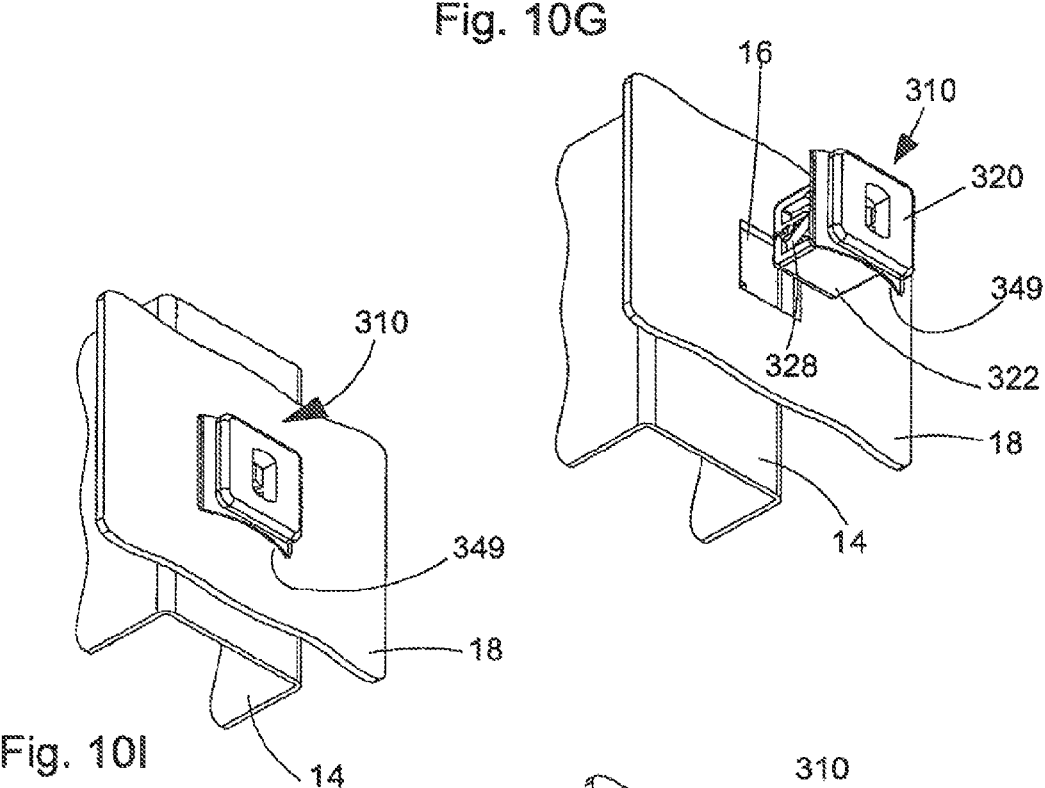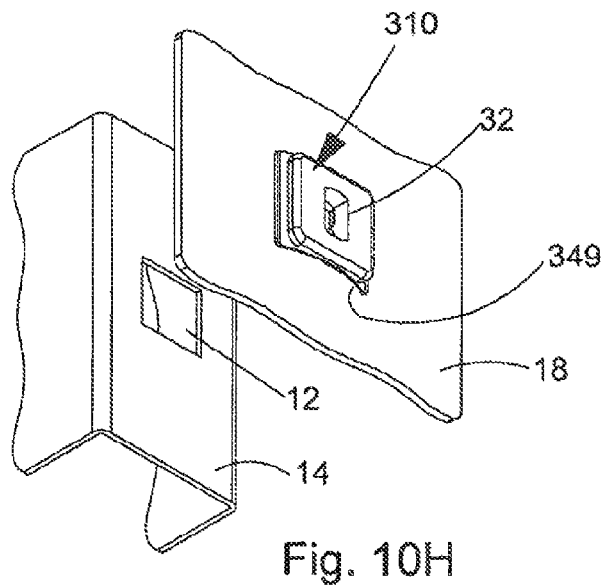

SNAP FASTENER

The present application claims priority from PCT Patent Application No. PCT/EP2009/005207 filed on Jul. 17, 2009, which claims priority from German Patent Application No. DE 20 2009 004 280.4 filed on Apr. 1, 2009, the disclosure of which is incorporated herein by reference in its entirety.

BACKGROUND OF THE INVENTION

1. Field of the Invention

The invention is directed to a snap fastener suitable for fastening a first thin wall such as a housing wall, door leaf, shutter, or the like, which is provided with a through-opening to a second wall such as a thin-walled wall support such as a housing frame, door frame, wall opening edge, or the like, which is likewise provided with a through-opening, having a base part which can be arranged at the first (or second) thin wall in the through-opening thereof, having a head part extending away from this base part, this head part having in its longitudinal section a diameter which initially increases and then decreases again from the end of the head part in direction of the base part, which head part presents a male plug-in piece which, by overcoming a spring force acting radially outward in direction of the diameter, can be received by an undercut female plug-in piece which is formed by or supported by the through-opening of the thin wall, wherein the head part presents a guide or channel for one or two or more push elements or holding elements which are pressed by at least one spring into a position in which they project over the end of the guide or channel, the ends of which push elements or holding elements projecting out of the guide or the channel have a triangular shape in a projection line extending perpendicular to the thin wall, wherein the base part is formed by a plate overlapping the longitudinal edges of the through-opening in the thin wall, wherein the head part, as a housing, is provided with fastening projections such as fastening cams (of flexible material) or leaf spring devices having flexible fastening surfaces, which housing can be snapped into a through-opening aperture in the thin wall in such a way that it grips only one thin wall (rear panel) and that unlocking devices (releasing means) are provided in the housing, by means of which unlocking devices the push elements can be pulled back into the housing from the front and the housing can be detached from the other thin wall (front panel), wherein the dimensions between the holding area of the fastening projections and those of the push elements on one hand and the support plane of the base part on the other hand are selected in such a way that the fastening projections lie upon the front panel with play when the push elements are pulled back.

2. Description of Related Art

A snap fastener of the type mentioned above is already known from WO 2008/128560.

A drawback in the prior art consists in that when fastening one wall part to another wall part with a plurality of snap fasteners of the type mentioned above, it is difficult to bring the snap fasteners simultaneously into the position that makes it possible to remove one wall part from the other wall part.

SUMMARY OF THE INVENTION

It is the object of the invention to improve a snap fastener of the type mentioned above in such a way that this disadvantageous characteristic is eliminated.

The above-stated object is met according to the invention in that a compression spring, particularly a coil spring or a concave leaf spring, extending between the support plane of the base part and the associated edge plane of the thin wall (front panel) is arranged on the support plane of the base part.

In this way, the snap fastener is automatically pushed into a position that allows one wall to be removed from the other without having to pay close attention to the individual snap fasteners.

According to a further development of the invention, the compression spring is a coil spring which, in the vicinity of the base part, surrounds the head part having the rectangular or square cross section. This prevents the snap fastener from rotating relative to the wall.

According to this construction of the invention, the compression spring is fastened at the support plane of the base part. This has the advantage that the spring does not get lost and is already located in the correct position when mounting.

According to another embodiment form of the invention, the coil spring is pressed against the support plane of the base part by a disk, which improves the distribution of forces of the coil spring on the wall.

Further, an embodiment form is made possible in which the disk forms a ring surrounding the axial extension of the coil spring in its compressed state and, in so doing, produces a positive-engaging pressure connection between the support plane and the edge plane of the thin wall (front panel). This has the advantage that a particularly secure fastening is made possible which is not dependent on the force of the spring.

On the other hand, the embodiment form not having the disk, or having the disk but without this annular shape, has the advantage of simplicity and offers the further possibility that a greater range of play can be bridged in that play can also be compensated by the compression spring or coil spring. The spring-supported play can also serve to allow the doors or shutter to be lifted off in the event of short circuits in electrical systems to permit occurring gases to escape or to relieve the pressure.

For example, it is possible for different panel thicknesses to be accurately fastened to one another without changing the snap fastener.

As in the prior art, the releasing means can be formed by an actuating pin which is rotatably supported in the base part. According to the invention, the actuating pin projects through the compression spring and the disk, if any, and forms a radial web at its inner front end facing the push elements, which radial web engages in recesses of the holding elements and pulls back the holding elements against spring force when the actuating pin is rotated in the releasing direction.

In an embodiment form of the invention, an axial bore hole extending to the recesses in the holding elements is provided instead of the actuating pin, and a screw driver having a flat blade can be inserted through the bore hole to pull back the holding elements with the blade. This eliminates the need for an actuating pin and reduces the cost of producing the snap fastener.

Alternatively, the actuating pin can also be provided at its outer end with a receptacle for a torque-applying tool, but the end does not extend beyond the head part so as to ensure compactness.

In this case, a tool is needed which fits into the receptacle and by which the snap fastener is loosened.

Another alternative consists in that the actuating pin is provided at its outer end with a handle such as a knurled turning knob which extends beyond the end of the head part, facilitates handling and makes it possible to loosen the snap fastener without a tool.

As a result of the newly designed spring, the spring pushes the snap fastener out without this manual movement far enough that it does not need to be pulled out any farther in order to remove one thin wall from the other thin wall. Further, the spring enlarges the clamping area. This has the additional advantage that it furnishes a means for checking that the walls have been successively connected because, if this hold should fail, this spring pushes the snap fastener back out again, thereby showing that it has not engaged.

BRIEF DESCRIPTION OF THE DRAWINGS

FIG. 1A shows an axial sectional view in an embodiment form of the snap fastener according to the invention;

FIG. 1B shows a top view of the embodiment form according to FIG. 1A;

FIG. 1C shows a sectional view along line E-E in FIG. 1B;

FIG. 1D shows a rear view of the arrangement according to FIG. 1A;

FIG. 1E shows an enlarged perspective view of the push elements and the releasing device;

FIGS. 2A, 2B, 2C and 2D show corresponding views of FIGS. 1A to 1D of the same snap fastener, but in thin walls;

FIG. 2E shows another type of releasing means in an enlarged view;

FIG. 4A shows a side view;

FIG. 4B shows an axial sectional view along line B-B of FIG. 4A;

FIG. 4C shows a sectional view along line A-A of FIG. 4A;

FIG. 4D shows a top view of the arrangement according to FIG. 4A;

FIG. 4E shows a perspective view according to FIG. 4A of the arrangement from FIG. 1A before mounting in a thin wall;

FIGS. 5A, 5B, 5C and 5D show different views of an arrangement similar to FIG. 4A, but without a handwheel;

FIGS. 6A and 6B show an embodiment form without an actuating pin in which the push elements are pulled back directly by a screw driver according to FIG. 6B;

FIGS. 7A, 7B, 7C and 7D show two sectional views, a front view and a perspective view for further illustration of the invention;

FIGS. 8A to 8F show various views of another embodiment form having a different fastening of the U-shaped holding spring; and FIGS. 9A to 9E show various views of another embodiment form having a compression spring in the form of a concave leaf spring and releasing by means of small wheels; and FIGS. 10A to 10I show various views of yet another embodiment form having concave leaf spring and release by means of screw driver.

DETAILED DESCRIPTION OF EMBODIMENTS

Figure 3:
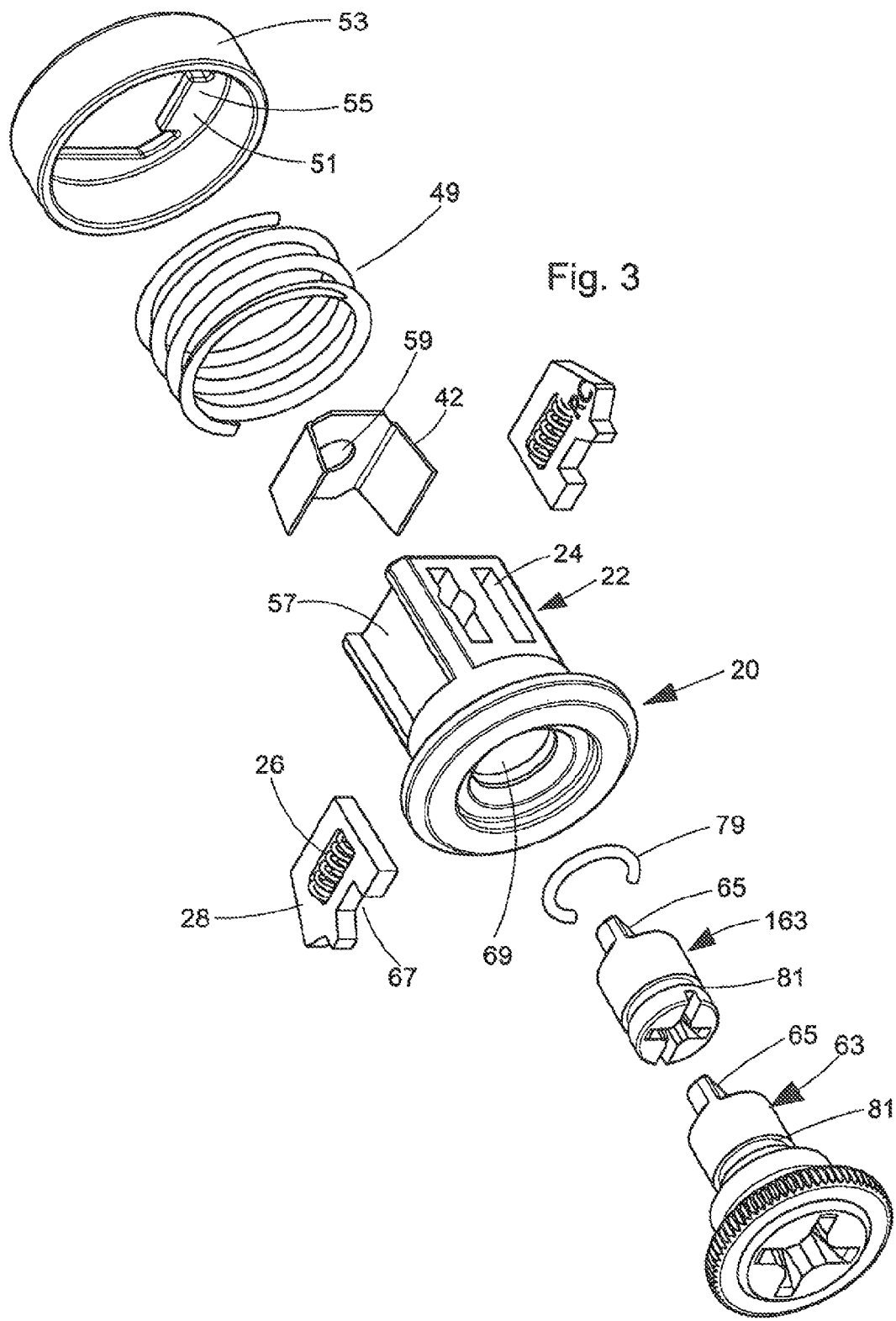
FIG. 3 shows an exploded view of the arrangement according to FIGS. 1A and 1B.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

In a first axial sectional view along section line D-D of FIG. 1B which shows a top view, FIG. 1A shows a snap fastener 10 which is suitable for fastening a first thin wall 14 such as a housing wall, door leaf, shutter, or the like, which is provided with a through-opening 12 to a second thin wall 18 such as a thin-walled wall support such as a housing frame, door frame, wall opening edge, or the like, which is likewise provided with a through-opening 16, having a base part 20 which can be arranged at the first (or second) thin wall 14 or 18 in the through-opening 12 or 16 thereof, having a head part 22 extending away from this base part 20, this head part 22 having in its longitudinal section a diameter (see reference number 30 in FIG. 1A) which initially increases and then decreases again from the end of the head part 22 in direction of the base part 20, which head part 22 presents a male plug-in piece which, by overcoming a spring force (see the compression spring 26 in FIG. 1C in a sectional view along section line E-E of FIG. 1B) acting radially outward in direction of the diameter, can be received by an undercut female plug-in piece which is formed by or supported by the through-opening 12 of the thin wall 14. The head part 22 forms a guide or channel 24 for one or two or more push elements or holding elements 28 which are pressed by at least one spring 26 into a position in which they project over the end of the guide or channel 24, the ends 30 of which push elements or holding elements 28 projecting out of the guide or channel 24 have a triangular shape in a projection plane extending perpendicular to the thin wall 14 or 16, the base part 20 being formed by a plate 38 which overlaps the longitudinal edges 36 of the through-opening 16 in the thin wall 18. The head part 22, as a housing 44, is provided with fastening projections such as fastening cams (of flexible material) or leaf spring devices 42 having flexible fastening surfaces 40, which housing 44 can be snapped into a through-opening 12 in the thin wall 14 in such a way that it only grips one thin wall (rear panel) 14 and that unlocking devices (releasing means) 46 are provided in the housing 44, by means of which unlocking devices the push elements 28 can be pulled back from the front into the housing 44. The housing 46 can be detached from the other thin wall 18 (front panel), and the dimensions between the holding area of the fastening projections 42 and those of the push elements 28 on one hand and the support plane of the base part 20 on the other hand are selected in such a way that the fastening projections 42 contact the front panel 18 with play when the push elements 28 are pulled back.

According to the invention, a compression spring 49 extending between the support plane 45 of the base part 20 and the associated edge plane 47 of the thin wall 18 (front panel) is arranged between the support 45 plane of the base part 20. A disk 151 (see FIG. 7A) can be provided between the edge plane 47 and the compression spring 49 so that the compression spring is pressed by this disk against the support plane 45 (see FIG. 1C) of the base part 20. The disk 51 can also form a ring 53 which surrounds the axial extension of the coil spring 49, thereby forming a positive-engaging pressure connection between the support plane 45 and the edge plane 47 of the thin wall (front panel) 18 when a certain force is exceeded by which the compression spring 49 is entirely compressed. This state is shown in FIG. 1A and also in FIG. 1C. When the panels 14, 18 or the thin wall is thinner than in FIG. 1A, it can be seen (e.g., in FIG. 2A) that a positive-engaging connection can no longer be produced without the compression spring according to the invention, and the snap fastener would be loose. This is prevented by the compression spring 49 which is relaxed and accordingly ensures a frictional engagement.

In so doing, the plate 39 moves away from the disk or ring 53 (see FIG. 2A).

As can also be seen in FIG. 3, the compression spring 49 is a coil spring which surrounds the head part 22 having the rectangular or square cross section in the vicinity of the base part 20, which can also be round.

In order to prevent the compression spring 49 from sliding off the head part or base part in an unwanted manner, the compression spring 49 can be secured at the support plane 45 of the base part 20. This can be carried out in that the diameter of the coil spring 49 is shaped in such a way that it is pushed at a certain pressure over the cross-sectional shape of the head part 22 and is accordingly clamped; however, the spring force must be sufficient to make possible an axial displacement for balancing the pressure forces.

Alternatively, the leaf spring 42 or the push elements 28 can also prevent the coil spring 49 from sliding off the snap fastening component. The leaf spring 42 can likewise secure the disk 51, to which end the disk can have inwardly projecting projections 55 (see FIG. 3). These projections are received by corresponding grooves 57 in the head part 22 and prevent rotation at the same time.

The leaf spring 42 which is bent in a U-shaped manner can have, in the area of its crosspiece, a through-opening 59 which is held on a shoulder 61 projecting from the head part 22. Instead of being held by a shoulder 61, the U-shaped leaf spring 442 according to FIGS. 8A to 8F can also be held in position by lateral projections 461 formed by the housing 446.

The releasing means 46 which pull back the push elements 28 can be formed by an actuating pin 63 or 163 (see FIG. 3) which is rotatably mounted in the base part 20. According to the invention, the actuating pin projects through the compression spring 49 and the disk 52, if any, and forms a radial web 65 at its inner front end directed to the push elements 28. This radial web 65 engages in recesses 67 of the holding elements 28 and pulls the holding elements 28 back into the housing against spring force 26 when the actuating pin 63, 163 is rotated in the releasing direction.

An axial bore hole 69 can also be provided instead of the actuating pin 63, 163, this axial bore hole 69 extending to the recesses 67 in the holding elements 28, and a screw driver 73 having a flat blade 71 can be inserted through the bore hole 69 to pull back the holding elements 28 with the blade 71.

According to FIG. 2E and FIG. 3, the actuating pin 63 can also be provided at an outer end with a receptacle for a torque-applying tool, preferably with a Phillips head receptacle 75, wherein the end of the receptacle does not extend beyond the base part.

Alternatively or in addition, the actuating pin 63 can be provided at its outer end with a handle such as a knurled knob 77 and can extend beyond the end of the base part 20 (see, for example, FIG. 4F, FIG. 1E or FIG. 3).

The actuating pin 63, 163 can contain a retaining ring 79 in the housing. The retaining ring 79 extends into an annular groove 81 of the actuating pin 63 or 163 on the one hand and into an annular groove 83 on the other hand. FIGS. 4A, 4B and 4C show the snap fastener according to FIG. 1A in an unmounted state when no thin wall is held or holds its snap fastening. It can also be seen how the cup-shaped annular disk 59 lies directly on the holding elements 28 and is accordingly prevented from sliding off.

A rectangular coil spring, not shown in the present instance, can also be used instead of the round spring 49 and would be better adapted to the shape of the head part 22 and would occupy less space.

According to FIGS. 9A to 9E, a concave leaf spring 249 can serve as a compression spring instead of the coil spring 49.

FIGS. 10A to 10I show an embodiment form in which flexible fastening cams are provided as fastening projections instead of the leaf spring devices 42 shown in FIG. 1C. Their function is taken over by the push elements or holding elements 328 according to FIG. 10B.

As is shown, the embodiment form according to FIGS. 10A to 10I functions in the following manner:

In FIG. 10A and FIG. 10G, the two thin walls 14 and 18 with their through-openings 12 and 16, respectively, and the snap fastener 310 are separated from one another. Leaf spring 349 and holding element 328 are relaxed.

In FIG. 10B and FIG. 10H, the snap fastener 310 with its head part 322 and the two holding elements 328 is pushed through the through-opening 16 of the door leaf 18 or the like; the leaf spring 349 is still relaxed, the holding elements 328 prevent the snap fastener 310 from sliding out of the through-opening 16 of the thin wall 18 again.

In FIG. 10C and FIG. 10I, the thin wall 18 with the snap fastener 310 held by it is fitted to the wall support 14 with the through-opening 12 until the holding elements 328 are completely pushed in; the leaf spring 349 is further relaxed. (This is also the release position which allows the wall 18 to be pulled from the wall 14).

Finally, in FIG. 10D and FIGS. 10E, 10F, after pressing in the base part 320 with the user's thumb against the force of the bent leaf spring 349, which flattens in so doing, the holding elements 328 spring back and now hold the two walls 14 and 18 firmly together.

The wall 18 is detached from the wall support 14 by means of a suitable socket wrench or tool such as a screw driver whose blade is inserted into the bore hole 32 extending up to the holding elements and turned until the holding elements 328 are fully drawn back, which corresponds to the transition from FIG. 10D to FIG. 10C. At this point, the spring force of the bent leaf spring 349 pulls the snap fastener back until the edges of the opening 12 of the wall support 14 are freed so that the state illustrated in FIG. 10B is achieved.

Further turning of the screw driver suffices to separate the holding element 310 from the wall support 14 should this be desirable.

The latter embodiment form has the advantage of economical production because the spring 42 is dispensed with. However, the thickness of the wall and that of the wall support must be selected in such a way that the wall support is not freed until the thin wall has been freed first.

The embodiment form according to FIGS. 1A to 10I supports greater tolerances.

INDUSTRIAL APPLICABILITY

The invention is industrially applicable in switch cabinet construction and façade construction.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 10, 310 snap fastener
12 through-opening 14 first thin wall, housing wall
16 through-opening
18 second thin wall, wall support
20, 320 base part
22, 322 head part
24 guide, channel
26 spring
28, 328 push element, holding element
36 longitudinal edge
38 plate
40, 440 fastening surfaces
42, 442 leaf springs
44 housing
45 support plane
46, 446 releasing means
47 edge plane
49, 249, 349 compression spring
51, 151 disk
53 ring
55 projections
57 groove
59 through-opening
61, 461 shoulder
63, 163 actuating pin
65 web
67 recess
69 bore hole
71 blade
73 screw driver
75 Phillips head receptacle
77 turning knob
79 retaining ring
81 annular groove
83 annular groove
D diameter

The invention claimed is:

1. A snap fastener suitable for fastening a first thin wall, which is provided with a first through-opening, to a second wall, which is provided with a second through-opening, the snap fastener comprising:
   a base part configured to be arranged at the first thin wall in the first through-opening; and
   a head part which extends away from the base part, and has a diameter, in a longitudinal section of the head part from an end of the head part in a direction of the base part, which initially increases and then decreases;
   wherein the head part includes:
      a male plug-in piece which, by overcoming a spring force acting radially outward in direction of the diameter (D), is configured to be received by an undercut female plug-in piece which is formed or supported by the through-opening of the first thin wall; and
      a guide or a channel which are formed in a plate which configured to overlap perpendicular to the second thin wall, and in which at least one push element or holding element is arranged;
      wherein the push or holding element is pressed by at least one spring into a position in which the push or holding element projects over an end of the guide or channel; and
      wherein an end of the push or holding element projects out of the guide or channel;
   wherein the head part is provided as a housing with fastening projections having flexible fastening surfaces;
   wherein the housing is configured to be snapped into the first through-opening of the first thin wall in such a way that the housing grips only the first thin wall;
   wherein releasing means are provided in the housing, and are configured to pull the push element back into the housing so that the housing can be disengaged from the second thin wall;
   wherein dimensions between a holding area of the fastening projections and a holding area of the push or holding element on one hand and a support plane of the base part on the other hand are configured in such a way that the fastening projections contact the second thin wall with play when the push element is pulled back; and
   wherein a compression spring, which extends between the support plane of the base part and an associated edge plane of the second thin wall, is arranged on the support plane of the base part.

2. The snap fastener according to claim 1;
   wherein the compression spring is a coil spring which surrounds the head part having a rectangular or square cross section in the vicinity of the base part.

3. The snap fastener according to claim 2;
   wherein the compression spring is fastened at the support plane of the base part.

4. The snap fastener according to claim 2;
   wherein the coil spring is pressed against the support plane of the base part by a disk.

5. The snap fastener according to claim 4;
   wherein the disk forms a ring surrounding an axial extension of the coil spring in a compressed state of the coil spring, so that the disk provides a positive-engaging pressure connection between the support plane and the edge plane of the second thin wall.

6. The snap fastener according to claim 1;
   wherein the releasing means are formed by an actuating pin which is rotatably supported in the base part;
   wherein the actuating pin projects through the compression spring, and forms a radial web at an inner front end of the compression spring directed to the push or holding element;
   wherein the radial web engages in a recess of the push or holding element, and is configured to pull back the push or holding element against spring force when the actuating pin is rotated in the releasing direction.

7. The snap fastener according to claim 6;
   wherein an axial bore hole which extends to the recesses in the push or holding element is provided instead of the actuating pin, and is configured so that a screw driver having a flat blade can be inserted through the bore hole to pull back the push or holding element with the blade.

8. The snap fastener according to claim 1;
   wherein an outer end of the actuating pin is provided with a receptacle for a torque-applying tool; and
   wherein the end of the actuating pin does not extend beyond the base part.

9. The snap fastener according to claim 1;
   wherein an outer end of the actuating pin is provided with a handle which extends beyond the end of the head part.

10. The snap fastener according to claim 1;
    wherein the compression spring is a concave leaf spring.

11. The snap fastener according to claim 1;
    wherein the fastening projections of the housing are held in position by lateral projections formed by the housing.

* * * * *